L. G. HAASE.
MOLD.
APPLICATION FILED OCT. 13, 1913.
1,118,855.
Patented Nov. 24, 1914.
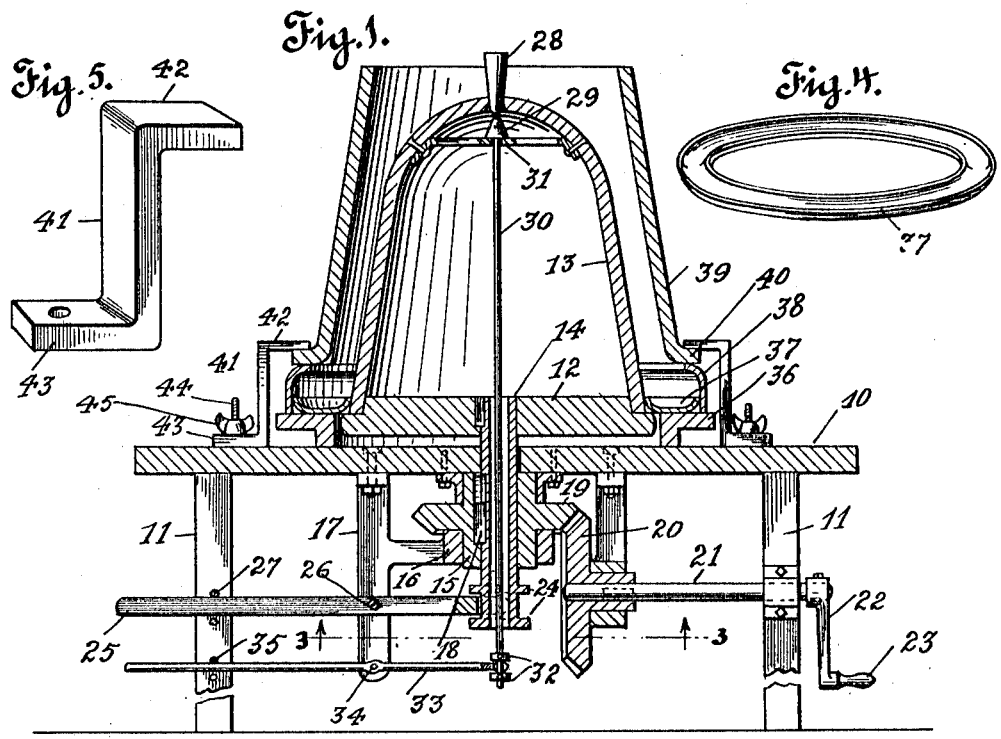
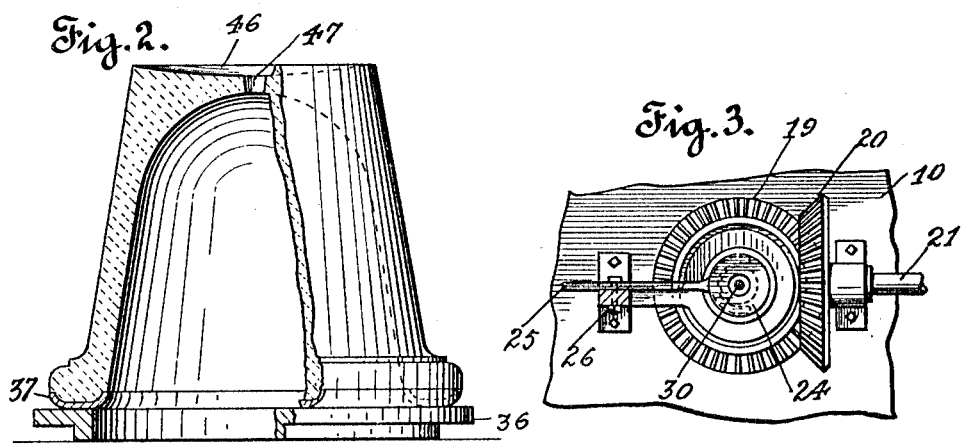
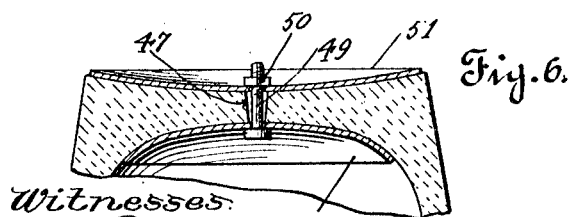
Inventor:
Leo G. Haase,
by
Hazard & Straus
Attys.
Witnesses:

UNITED STATES PATENT OFFICE.

LEO G. HAASE, OF PASADENA, CALIFORNIA.

MOLD.

1,118,855. Specification of Letters Patent. Patented Nov. 24, 1914.

Application filed October 13, 1913. Serial No. 794,768.

*To all whom it may concern:*

Be it known that I, LEO G. HAASE, a citizen of the United States, residing at Pasadena, in the county of Los Angeles, State of California, have invented new and useful Improvements in Molds, of which the following is a specification.

This invention relates more particularly to molds for forming flower pots or vessels of similar form, and the principal object is to provide a mold in which a vessel formed of cement may be molded and the core of the mold revolved after the concrete is tamped in place.

It is also an object to provide a concrete mold with a separable base ring.

It is also an object to provide a mold with a removable jacket clamped adjacent to the movable core.

It is also an object to provide means to lower the core and "trowel" the inside of the pot to make a waterproof lining for the same.

It is a further object to provide means for revolving the core and admit water around the same to accomplish the above named objects.

In the drawings accompanying this specification and forming therewith the application for Letters Patent: Figure 1 is a central vertical section through the structure showing the mold mounted upon the table on which are also mounted the movable parts. Fig. 2 is an elevation of a finished pot showing it still in position on the base ring after removal from the machine and uncovered by the jacket. Fig. 3 is a section on the line 3—3 of Fig. 1 looking in the direction indicated by the arrows. Fig. 4 is a perspective view of the annular chambered ring on which the upper edge of the pot is molded. Fig. 5 is a detail perspective of one of the clamp brackets. Fig. 6 is a central section view through the bottom of the pot, showing applied thereto the two supporting plates to support the bottom of large sized pots while the curing process is taking place.

Heretofore in the molding of flower pots or vases requiring a stable base, they have been built from the pot bottom upward making it difficult to form them in the modern manner of concrete and requiring elaborate forms and molds, which of necessity have required a complete set for each pot molded. Objection has also been found in the pottery structures in the producing of a sharp corner at the base for the pot to rest steadily upon, while the inside is necessarily so formed resulting in a sharp corner in which the roots of inclosed trees are prone to expand and crack the pots and any tendency to sour starts in the remotest corner from the atmosphere, the sharp corners tending to increase this undesirable action.

This invention overcomes the objections as noted above, and in inverting the molds the heavier portions are built first and in curing the pot it rests on its upper edge, fewer parts of a mold being required to accomplish this support while the structure is curing, and by forming a domed shaped core, round corners are provided in the bottom of the pot or base and the roots meeting these curved surfaces will branch off in other directions. As there is no baking to take place as in pottery, the structure will not fail at this point due to any unequal expansion of the material.

More specifically in the drawings, 10 represents a table top supported by suitable legs of the frame 11 upon which is mounted the base 12 of the revolving core 13.

Extending through the table securely and keyed to the base 12 is the hollow shaft 14 slidably mounted in the sleeve 15 which has bearings 16 supported by suitable brackets 17 secured to the bottom of the table. The shaft 14, as stated, is securely keyed by a key at the base of the core 12 and is provided with a slot on its periphery in which slides the feather 18, the latter being secured in the sleeve 15. This sleeve 15 is also provided with a bevel gear face 19, this in turn meshing with the bevel gear 20 mounted on the shaft 21 which extends outside the table which is shown provided with a crank 22 adapted to be turned by means of a handle 23.

The lower end of the shaft 14 is provided with two flanges 24 the groove formed thereby being adapted to embrace the yoke on the end of the lever 25. This lever 25 being pivoted at the point 26, its movement being limited by the stops 27, and by moving the lever the shaft is lifted or depressed as desired.

The mold 13 as shown, is a tapered truncated cone, the truncated end being turned off to form a dome which determines the shape of the bottom of the inside of the pot. Axially situated at the top of the dome is the orifice 15′ adapted to receive a plug 28 or the valve plug 29. This valve plug 29 is mounted on the end of the rod 30 guided by the bracket 31, the rod extending through the hollow shaft in the axial line to a point below the end of the shaft 14 where it is provided with the collars 32, the groove formed by these two collars being adapted to receive the yoke on the inner end of the lever 33, which is pivoted at the point 34 also provided with limiting stops 35, this end of the lever 33 extending beyond the edge of the table in a position convenient to be operated.

As clearly shown, the base of the core 12 is placed just above the table on which is supported the annular base ring 36 preferably formed of angular cross section with the inner diameter slightly greater than that of the base 12. On the horizontal flange forming this annular structure is placed the annular ring 37 preferably formed of light galvanized iron, its upper surface conforming with the top rim of the pot desired to be formed, its inner edge resting tightly against the core 13. Surrounding this ring 37 is the hoop 38, this hoop being preferably bifurcated, not shown, or formed in sections so that it may be securely clamped in close contact with the peripheral edge of the ring 37, its lower edge resting on the base ring 36, and its upper edge being bent over to form a support for the jacket, and curved to form a finish for the rim of the pot. Supported on the rim is the jacket 39 of tapered, conical form, provided with a peripheral flange 40 which rests upon the hoop 38, the upper or truncated portion of the jacket being open and extending the required distance above the dome of the core to provide for the thickness of the bottom of the pot. To secure this jacket in its concentric position in relation to the core in the other concentric members of the form, clamp arms 41 are shown provided with an arm 42 to engage the flanges 40 and a base 43 through which are passed the bolts 44 secured in the table and provided with suitable wing nuts 45.

In the operation of this device the conical plug 28 is introduced from above into the orifice in the dome of the core, the parts having been assembled as described heretofore. The outer end of the lever 25 is depressed which forces the cone upward to the preferred position, the concrete is poured from the top and tamped into the space around the sides of the core inclosed by the jacket. When the filling is complete the top is preferably formed slightly convexed at 46, as shown clearly in Fig. 2, and the plug 28 is removed. If it is desired at this time to build a pot that will be impervious or not sweat, tension on the lever 25 is released the core drops to a slight extent and by pressing the outer end of the lever 33, the valve 29 is forced to its seat and a slight amount of water poured into the recess in the base of the pot trickles down through the opening 47 and is carried around on the inner surface of the molded structure, and the outer periphery of the core and by revolving the core by means of the handle 23 or any other suitable source of power, the inside is "troweled" the cement tending to be drawn to the surface by this well-known action, and the "neat coating" will form a complete water proof lining when the structure is cured.

To accomplish the curing action the clamps are released and swung out of the way when the molded structure can be readily lifted out of contact with the core by slipping the fingers under the flanges of the base ring, lifting the jacket and the formed concrete bodily from the table. It is then rested upon a suitable curing table and the jacket is lifted from contact with the freshly molded pot. Releasing the clamps from the hoop 38 and these parts can be used again to form another pot, the only duplicate parts required being the base ring and the annular ring 37, to complete any number of molded pots.

In molding large sized vases, the weight at the bottom is sometimes sufficient to cause the concrete to fail, and in structures of this size the supporting disk 48 is provided, which closely fits the bottom of the inside of the pot and bears upon the head of the bolt 49, provided with the nut 50, this nut 50 bearing upon the plate 51 adapted to entirely cover the outside of the concave bottom of the pot, a tightening of the nut 50 giving any tension and the necessary support to the central portions of the bottom.

What I claim is:

1. A mold, comprising a movable core, a base ring adjacent said core, a chambered ring supported on said base ring, a hoop encircling said chambered ring, a jacket supported on said hoop and means to clamp said jacket and hoop on the supporting ring.

2. A mold, comprising a core, a base ring, an annular chambered ring supported on said base ring and engaging said core, a hoop engaging said chambered ring, and a jacket supported on said base ring and secured in surrounding relation to said core.

3. A mold, comprising a core, a base ring, an annular chambered ring supported on said base ring and engaging said core, a hoop engaging said chambered ring, and a jacket supported on said base ring and secured in surrounding relation to said core, and means for shifting the core vertically in relation to the jacket.

4. A mold, comprising a core, a base ring, an annular chambered ring supported on said base ring and engaging said core, a hoop engaging said chambered ring, and a jacket supported on said base ring and secured in surrounding relation to said core, and means for rotating said core in relation to the jacket.

5. A mold, comprising a core, a base ring, an annular chambered ring supported on said base ring and engaging said core, a hoop engaging said chambered ring and a jacket supported on said base ring and secured in surrounding relation to said core, means for moving the core vertically in relation to the jacket, and means for rotating said core.

6. A mold, comprising a hollow core, having an orifice in its upper end for the reception of a plug, a valve adapted to close said orifice from the interior of the core when the plug is withdrawn, whereby the orifice is closed to prevent the passage of liquid therethrough, and means for operating said valve exteriorly of the core.

7. A mold, comprising a vertically movable and revoluble core having an orifice in its upper end to receive a plug, valve means for closing said orifice when the plug is withdrawn, a jacket encircling said core and removably mounted in relation thereto, means for lowering the core in relation to the molded article between the core and the jacket, whereby liquid may be introduced between the core and the molded article, means for operating the valve to prevent the passage of liquid through the orifice in the core, and means for rotating the core simultaneously with the raising and lowering thereof, whereby a troweling action is effected on the interior of the molded article.

In witness that I claim the foregoing I have hereunto subscribed my name this 19th day of September, 1913.

LEO G. HAASE.

Witnesses:
 MERLE HAMMOND,
 MARIE BATTEY.

Copies of this patent may be obtained for five cents each, by addressing the "Commissioner of Patents, Washington, D. C."